United States Patent
Zaghib et al.

(10) Patent No.: US 10,147,978 B2
(45) Date of Patent: Dec. 4, 2018

(54) ELECTROLYTE PURIFICATION METHOD USING CALCIUM CARBIDE, AND ELECTROLYTES THUS OBTAINED

(75) Inventors: Karim Zaghib, Montreal (CA); Jocelyn Jalbert, Repentigny (CA); Abdelbast Guerfi, Brossard (CA); Christophe Michot, Montreal (CA); Michel Gauthier, La Prairie (CA); Martin Dontigny, Notre-Dame-du-Mont-Carmel (CA); Patrick Charest, Sainte-Julie (CA)

(73) Assignee: HYDRO-QUEBEC, Montreal QC (CA)

( * ) Notice: Subject to any disclaimer, the term of this patent is extended or adjusted under 35 U.S.C. 154(b) by 1817 days.

(21) Appl. No.: 11/991,270

(22) PCT Filed: Jul. 28, 2006

(86) PCT No.: PCT/CA2006/001242
§ 371 (c)(1),
(2), (4) Date: Feb. 29, 2008

(87) PCT Pub. No.: WO2007/025361
PCT Pub. Date: Mar. 8, 2007

(65) Prior Publication Data
US 2009/0123845 A1    May 14, 2009

(30) Foreign Application Priority Data

Aug. 29, 2005 (CA) ..................... 2517248

(51) Int. Cl.
| | |
|---|---|
| *H01M 10/42* | (2006.01) |
| *H01M 10/0566* | (2010.01) |
| *B01D 15/00* | (2006.01) |
| *H01M 10/0565* | (2010.01) |

(52) U.S. Cl.
CPC ........ *H01M 10/4242* (2013.01); *B01D 15/00* (2013.01); *H01M 10/0566* (2013.01); *H01M 10/0565* (2013.01); *H01M 2300/0085* (2013.01)

(58) Field of Classification Search
CPC ............................................... H01M 10/4242
See application file for complete search history.

(56) References Cited

U.S. PATENT DOCUMENTS

| | | | |
|---|---|---|---|
| 3,072,567 A * | 1/1963 | Evans et al. ........... | 208/304 |
| 5,683,832 A | 11/1997 | Bonhote et al. | |
| 5,849,429 A * | 12/1998 | Sazhin et al. ........... | 429/49 |
| 6,197,205 B1 | 3/2001 | Tsujioka et al. | |
| 6,423,210 B1 * | 7/2002 | Jalbert et al. ........... | 208/188 |
| 6,573,002 B1 | 6/2003 | Jungnitz et al. | |
| 2001/0025943 A1* | 10/2001 | Michot et al. ........... | 252/62.2 |
| 2002/0015883 A1 | 2/2002 | Hilarius et al. | |
| 2003/0003359 A1 | 1/2003 | Banno et al. | |
| 2003/0153457 A1* | 8/2003 | Nemoto et al. ........... | 502/402 |

FOREIGN PATENT DOCUMENTS

| | | | | |
|---|---|---|---|---|
| CA | 2 424 361 A1 | 3/2003 | | |
| EP | 1 498 409 A1 | 1/2005 | | |
| JP | 59-009874 A1 | 1/1984 | | |
| JP | 59009874 A * | 1/1984 | ............ | H01M 10/40 |
| JP | 59-046764 A2 | 3/1984 | | |
| JP | 59046764 A * | 3/1984 | ............ | H01M 6/16 |
| JP | H10-092468 A | 4/1998 | | |
| JP | H11-154519 A | 6/1999 | | |
| JP | H11-204134 A | 7/1999 | | |
| JP | 2000357537 A * | 12/2000 | ............ | H01M 10/40 |
| JP | 2002-003478 A | 1/2002 | | |
| JP | 2002-187893 A | 7/2002 | | |
| JP | 2002-270235 A | 9/2002 | | |
| JP | 2002 343 454 A | 11/2002 | | |
| JP | 2003-327687 A | 11/2003 | | |
| JP | 2004-124051 A | 4/2004 | | |
| JP | 2005-276613 A | 10/2005 | | |
| WO | WO 2004080974 A1 * | 9/2004 | ............ | C07D 233/12 |

OTHER PUBLICATIONS

Hand translation of Watanabe et al., 59-009874 A.*
International Search Report for PCT/CA2006/001242 dated Oct. 27, 2006.
Extended European Search Report issued by the EPO dated Sep. 7, 2010 in corresponding EP Application 06775050.5-2133.
Database WPI Week 200325, Thomson Scientific, London, GB; An 2003-251504 XP002598275.

* cited by examiner

Primary Examiner — Barbara L Gilliam
Assistant Examiner — Robert S Carrico
(74) Attorney, Agent, or Firm — Buchanan Ingersoll & Rooney P.C.

(57) ABSTRACT

Process for the purification of an ionic electrolyte comprising at least one alkali metal salt, the process having at least one stage in which particles of at least one calcium salt are brought into contact. The process makes it possible to obtain electrolytes characterized in particular by a particularly low water content. The corresponding electrochemical generators which incorporate the electrolyte as constituent component are characterized by a noteworthy stability and are particularly safe.

9 Claims, No Drawings

ELECTROLYTE PURIFICATION METHOD USING CALCIUM CARBIDE, AND ELECTROLYTES THUS OBTAINED

GENERAL FIELD OF THE DISCLOSURE

The present disclosure relates to a process which makes possible purification of an ionic electrolyte comprising at least one alkali metal salt. The purification is carried out by bringing the ionic electrolyte into contact with at least one calcium salt.

The ionic electrolytes thus purified are in particular of liquid, polymer gel or molten salt type or of the type consisting of a mixture of at least two of the latter.

The process of the disclosure makes it possible more particularly to strongly dehydrate the electrolytes treated.

The disclosure applies in particular to the preparation of electrolytic solutions of mixed and purified type. These solutions comprise at least one salt of an alkali element, such as lithium salt, dissolved in at least one solvent of carbonate type, such as ethylene carbonate (EC) or propylene carbonate (PC).

The process of the disclosure can also be used for the purification of impure lithium salts.

The process of the disclosure thus makes it possible in particular to obtain electrolytic solutions of ionic conducting type which exhibit a low residual water content which can be less than 150 ppm of water.

The process also makes it possible in particular to obtain purified lithium salts with less than 100 ppm; those for which the $H_2O$ content is less than or equal to 20 ppm are novel and form part of the present disclosure.

The purified electrolytes obtained by the processes of the disclosure, in particular the anhydrous solutions thus obtained with a water content of less than or equal to 20 ppm per liter of electrolyte solution, are novel due to their original intrinsic characteristics and also form part of the disclosure.

Likewise, the electrochemical generators of the disclosure which incorporate a purified electrolyte of the disclosure and/or a purified lithium salt of the disclosure exhibit in particular an exceptional stability on storage, they are novel and also constitute an embodiment of the disclosure.

STATE OF THE ART

Electrolytic solutions of ionic type are conventionally prepared by mixing specific amounts of a salt, for example of an alkali metal salt, of solvents and optionally of a polymer when a consistency of gel type is desired, of use in particular in the preparation of batteries of Li-ion or Li-metal type, in order to obtain a high energy density.

In the field of lithium-ion batteries, electrolytes of $LiPF_6$+ EC-DEC type are used in commercial batteries. The aging of the electrolytes as a function of time generates water. The long-term storage of the electrolytes results in the latter being contaminated by the formation of water. When the amount of water in the electrolyte exceeds 50 ppm, the performance of the battery is damaged, thus the lifetime is reduced and the undesirable phenomenon of self-discharge is enhanced.

During the preparation of the electrolyte, the water content is highly critical as the presence of water in the electrolyte is also the cause of the formation in particular:
of fluorinated derivatives, such as HF, an aggressive acid which attacks all the parts of the battery;
of hydroxides of the alkali metal salt, formed in situ in the presence of the alkali metal salt, which unnecessarily increase the resistance of the batteries; and
of interfering ionic reactions.

Moreover, the water reduces the electrolyte and is the cause of the formation of a passivation film on the electrodes; this reaction is accompanied by the formation of gas and renders the battery unsafe.

The water content of electrolytes of ionic type, at the time of their preparation, is usually within 500 and 1000 ppm.

The presence, in an electrochemical system, of an electrolyte comprising more than 100 ppm by weight of water reduces its commercial interest by rendering it unsafe and by generating a loss in output at the electrodes.

Mention is made, among the techniques currently used to limit the water contents of ionic solutions, of:
the use of components with a low water content and the preparation in anhydrous medium; and
dehydration by passing over a molecular sieve.

These processes are complex to carry out and expensive, in particular owing to the fact that several passes over molecular sieves are necessary and the sieves have to be regenerated after they have been used a limited number of times.

Furthermore, the residual water contents present in such electrolytes are still high and the other impurities are still present.

The complexity and the expensive nature of the processes known for the purification of electrolytes are recalled in "Handbook of Battery Materials" by J. O. Besenhard, Wiley-VCH, 1999, page 464.

The purification of electrolytic solutions based on lithium salts is all the more complex as such salts are usually obtained accompanied by impurities.

Furthermore, electrolytic solutions have a marked tendency to hydrate, both on storage and in use, which results in a substantial loss in effectiveness of the electrochemical systems in which these solutions are present. A loss in effectiveness on storage is observed after a few months and a loss in effectiveness in operation after a few cycles in humid regions, in particular in tropical regions.

These losses in effectiveness necessitate returning the electrolytes to the factory in order to be redehydrated there, according to the same expensive processes, or incorporating the electrolytes in electrochemical systems of low commercial value.

The dehydration of neutral solutions, such as oils, by the introduction of a calcium carbide ($CaC_2$) is described in patent CA-A-22 077 30 of Hydro-Québec. However, this document does not comprise any mention of the fact that $CaC_2$ might be used to purify solutions of ionic type.

There thus existed a need for a novel process for the purification of ionic electrochemical solutions, which process is devoid of the disadvantages of the processes described in prior art and makes possible not only partial dehydration but also high level purification of the electrolyte.

In addition, this process should be able to be carried out both in the factory in which the electrolytic solutions are prepared and on the sites of storage by ordinary operators, be inexpensive and require the minimum of equipment.

DETAILED DESCRIPTION

In the context of the disclosure, the term "electrolytic" is understood to mean any solution which can be used as electrolyte. The solutions defined on page 2 of the work Electrochemistry Method by Allen J. Bard and Larry R. Faulkner, 1980 edition, from John Wiley & Sons, are concerned in particular.

The notion of electrolyte is associated with that of electrochemical generator, in which a system comprising two phases, electrolyte 1/electrolyte 2 or electrolyte/electrode, is the cause of a movement of charges.

In this reference document, an electrolyte is defined essentially as a first phase through which a charge is generated by the movement of ions.

The electrolytes can be liquid solutions or molten salts, or they can be ionic conducting solids, such as sodium β-alumina, which exhibits mobile sodium ions.

The second phase at the surface can be another electrolyte, or can be an electrode, which is a phase through which a charge is produced by a movement of electrons.

The electrolytic solutions which can be purified by use of the method of the disclosure preferably comprise:

between 0.1 and 2 Molar of at least one alkali metal salt which is preferably chosen from the group consisting of KTFSI, $NaBF_4$, lithium salts and the mixtures of at least two of these salts;

a solvent for the alkali metal salt, which contributes to the ionic conductivity of the solution;

up to 6000 ppm, preferably between 50 and 5000 ppm, of impurities, preferably including at least 700 to 2000 ppm of water, the other impurities preferably being chosen from the group consisting of HF, Na and K; and preferably, in the case of electrolytes of polymer gel type, up to 30% by weight of a polymer or a blend of polymers which provides the formation of a gel matrix or of several gel matrices within the liquid electrolyte.

The process which is an embodiment of the disclosure is characterized in that it comprises at least one stage in which particles of a calcium salt are brought into contact with the liquid electrolyte to be purified.

In the case where the electrolyte comprises a polymer capable of giving a gel matrix by crosslinking, the crosslinking of the polymer is preferably completed in the presence of a crosslinking agent and/or in the presence of a UV source and after the end of the purification treatment.

In the context of the present disclosure, reference is made, for the definition of molten salts, in their general nature, to "Molten Salt Techniques", Volume 1, by D. G. Lovering and R. J. Gale, 1942, published by Plenum Press, New York, C 1983-1984, more particularly on pages 2 to 5; this document is incorporated by reference in the present patent application.

G. Morant and J. Hladik, in Électrochimie des sels fondus [Electrochemistry of Molten Salts], volume I, propriétés de transport [Transportation Properties], published by Paris Masson, 1969, specify, in the chapter propriétédes solvants [Property of the Solvents], that, on the basis of the structure of the liquid, the molten salts can be divided into two groups. The first group is composed of the compounds, such as alkali metal halides, which are bonded mainly via ionic forces and the second group comprises compounds essentially comprising covalent bonds. This document is incorporated by reference in the present patent application.

The molten salts are specific solvents, regarded as ionized solvents, in which it is possible to easily dissolve inorganic compounds and to operate at high temperatures. They are often ionic salts, such as LiCl—KCl, NaCl—KCl and $LiNO_3$—$KNO_3$. This definition is taken from session 2003, specific test-PC network-Institute National Polytechnique de Toulouse; this document is incorporated by reference in the present patent application.

In the context of the present disclosure, the term "molten salts" is understood to mean the salts which are in the liquid state at a temperature of between −30 and 350° Celsius, preferably between −20 and 60° Celsius. This is because, at temperatures of greater than 350° Celsius, there is a risk that the polymers present in the mixtures of the disclosure would be carbonized.

Still more particularly, the molten salts of advantage in the context of the present disclosure are those composed of at least two salts chosen from the group consisting of imidazolium, imidinium, pyridinium, ammonium, pyrrolium, sulfonium and phosphonium salts and of the mixtures of at least two of the latter.

Mention is made, as preferred examples, of the soluble hydrophobic salts described in U.S. Pat. No. 5,683,832 (Bonhote et al.) and those described in the document "Room Temperature Molten Salts as Lithium Battery Electrolyte" by M. Armand et al. published in Electrochimica Acta, 49 (2004), pages 4583-4588, and the mixtures of at least two of the latter. These two documents are incorporated by reference in the present patent application.

These molten salts are present in the polymer/molten salts/solvent (PSS) ternary mixtures of the disclosure. These mixtures, and the corresponding quaternary mixtures obtained by addition of ionic conduction salt, are in the homogeneous and liquid form at ambient temperature.

The polymer or the blend of polymers present in the ternary or quaternary mixture is chosen from the family of the polymers of 3-branch polyether type (preferably those described in the Hydro-Quebec U.S. Pat. No. 6,280,882) or 4-branch polyether type (preferably those described in the Hydro-Quebec international patent application published under the number WO 03/063287), or the vinyl polymers of EG type (preferably those described in the DKS patent application EP-A-1 249 461) and of the blends of at least two of the latter polymers; the documents cited in this paragraph are incorporated by reference in the present patent application. The polymers of these preferred families are furthermore advantageously chosen from the polymers which can be crosslinked by ultraviolet radiation, infrared radiation, heat treatment and/or an electron beam (E Beam). These polymers are preferably chosen transparent.

3-Branch Polymers:

As illustrated in the document "Relationship between Structural Factor of Gel Electrolyte and Characteristics of Electrolyte and Lithium-ion Polymer Battery Performances", by Hiroe Nakagawa et al., the 44th Symposium in Japan, Nov. 4-6, 2003, abstract 3D26, 3-branch polymers have the form of a 3-branch comb. The 3 substantially parallel branches of these polymers are preferably attached to the center and to the two ends of a small backbone, preferably comprising 3 carbon atoms, preferably 2 carbon atoms, in the chain.

In the case of a chain comprising 3 carbon atoms, each of these atoms is connected to a branch.

Among these 3-branch polymers, and in the context of the present disclosure, preference is given to those which exhibit an average molecular weight (Mw) varying from 1000 to 1 000 000, still more preferably those having an average molecular weight varying from 5000 to 100 000.

Four-Branch Polymers:

The Hydro-Québec international patent application WO 03/063287 describes a family of four-branch polymers regarded as preferential for the disclosure.

Such polymers have the form of a 4-branch comb. The 4 substantially parallel branches of these polymers are respectively attached between the two ends (preferably attached symmetrically to the chain) and at the two ends of a small chain preferably composed of a chain comprising 4 atoms which are preferably 4 carbon atoms.

In the case of a chain comprising 4 carbon atoms, each atom is connected to a branch.

Such polymers preferably have hybrid endings, more preferably acrylate (preferably methacrylate) and alkoxy (preferably alkoxy with from 1 to 8 carbon atoms, more preferably methoxy or ethoxy) or also vinyl hybrid endings, one branch at least of said four-branch polymer (preferably at least two branches) being capable of giving rise to a crosslinking.

Preferably, the four-branch polymer is one of those defined in columns 1 and 2 of the U.S. Pat. No. 6,190,804 (Ishiko et al.). This document is incorporated by reference in the present patent application.

Such a polymer is preferably a star polymer of polyether type which has at least four branches having endings comprising the following functional groups: acrylate or methacrylate and alkoxy, allyloxy and/or vinyloxy, at least one of which and preferably at least two of which of these functional groups are active in order to make crosslinking possible.

Other families of polyethers, the molecular weight of which is greater than or equal to 30 000, are advantageously used in the context of the present disclosure.

According to another preferred embodiment, the 4-branch polymer is a tetrafunctional polymer, preferably with a high molecular point, corresponding to the formula (I):

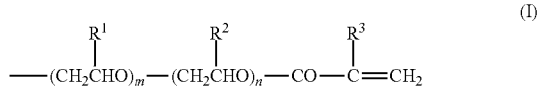

in which $R^1$ and $R^2$ each represent a hydrogen atom or a lower alkyl (preferably of 1 to 7 carbon atoms); $R^3$ represents a hydrogen atom or a methyl group; m and n each represent an integer greater than or equal to 0; in each chain with a high molecular weight, m+n>35; and each of the $R^1$, $R^2$ and $R^3$ groups and each of the parameters m and n can be identical or different in the 4 chains having a high molecular weight.

Among these four-branch polymers, those which have an average molecular weight of between 1000 and 1 000 000, more preferably still those which have an average molecular weight varying from 5000 to 100 000, are particularly advantageous.

According to another preferred form, the polyethers of star type of at least four branches with a hybrid ending (acrylate or methacrylate and alkoxy, allyloxy, vinyloxy) are selected.

Also, the vinyl polymers of EG type and more particularly those described in the DKS patent application EP-A-1 249 461 are of particular advantage as protective material. Particularly advantageous among these polymers are those having an average molecular weight varying from 600 to 2500.

Polymers of this family can advantageously be obtained by reacting ethylene oxide and 2,3-epoxy-1-propanol with the starting material or by reacting 2,3-epoxy-1-propanol with ethylene glycol as starting material to produce a polymer compound. This stage is followed by the introduction of polymerizable and/or nonpolymerizable functional groups at each end of a backbone and side chains in the resulting polymer compound.

The compounds having one or more active hydrogen residues and alkoxide compounds can also be used as starting materials.

Examples of active hydrogen residues for the compound having one or more active hydrogen residues include the group of the hydroxyls, preferably having from 1 to 5 active hydrogen residues. Specific examples of the compounds having one or more active hydrogen residues include triethylene glycol monomethyl ether, ethylene glycol, glycerol, diglycerol, pentaerythritol and their derivatives.

Specific alkoxide examples also include $CH_3ONa$, t-BuOK and their derivatives.

The polyether polymer compounds of the disclosure have the structural unit represented by the formula (1) and also the structural unit represented by the formula (2) and/or the structural unit represented by the formula (3). The number of structural units represented by the formula (1) in a molecule is from 1 to 22 800, more advantageously from 5 to 11 400 and more advantageously still from 10 to 5700. The number of structural units of the formula (2) or (3) (but, when both are included, this is the total number) is from 1 to 13 600, more advantageously from 5 to 6800 and more advantageously still from 10 to 3400.

The formulae (1), (2) and (3) are:

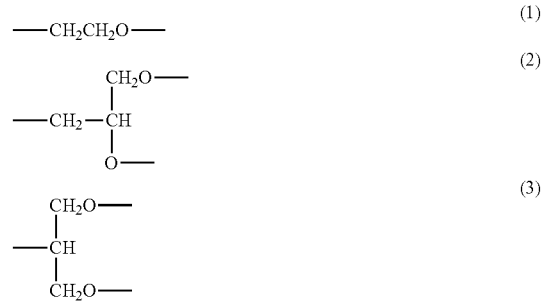

Examples of polymerizable functional groups introduced in each molecular end include (meth)acrylate residues, allyl groups and vinyl groups and examples of nonpolymerizable functional groups include alkyl groups or functional groups comprising boron atoms.

Like the above alkyl groups, alkyl groups having from 1 to 6 carbon atoms are advantageous, those having from 1 to 4 carbon atoms are more advantageous and methyl groups are of particular advantage.

Examples of functional groups comprising boron atoms include those represented by the following formulae (4) and (5).

$R^{11}$ and $R^{12}$ in the formula (4) and $R^{21}$, $R^{22}$ and $R^{23}$ in the formula (5) can be identical or different and each represents a hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamido, oxycarbonylamino, ureido, acyl, oxycarbonyl, carbamoyl, sulfonyl, sulfynyl, oxysulfonyl, sulfamoyl, carboxylate, sulfonate, phosphonate, heterocycle, —B($R^a$)($R^b$), —OB($R^a$)($R^b$) or OSi($R^a$)($R^b$)($R^c$). ($R^a$), ($R^b$) and ($R^c$) each represent a hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamido, oxycarbonylamino, ureido, acyl, oxycarbonyl, carbamoyl, sulfonyl, sulfynyl, oxysulfonyl, sulfamoyl, carboxylate, sulfonate, phosphonate, heterocycle or derivatives of these. $R^{11}$ and $R^{12}$ in the formula (4) and $R^{21}$, $R^{22}$ and $R^{23}$ in the formula (5) can be bonded together to form a ring and the ring can have substituents. Each group can also be substituted by substitutable groups. Furthermore, $X^+$ in the formula (5) represents an alkali metal ion and is advantageously a lithium ion.

The ends of the molecular chains in the polyether polymer can all be polymerizable functional groups or nonpolymerizable functional groups or can include both.

The average molecular weight (Mw) of this type of polyether polymer compound is not specifically limited but it is usually from approximately 500 to 2 million and advantageously from approximately 1000 to 1.5 million.

The polymers of these preferred families are furthermore advantageously chosen from the polymers which may be crosslinked by ultraviolet radiation, infrared radiation, heat treatment and/or an electron beam (E Beam).

The polymer matrix is preferably formed in the electrochemical system in which the electrolyte precursor is placed and preferably by using one of the methods described in the international patent application published under the number WO 2004/088610 or the Hydro-Québec US application published under the number 2005/0234177 A1; the content of these documents is incorporated by reference in the present application.

The introduction of $CaC_2$ into the electrolytic solution makes it possible to reduce the residual water present after the dehydration and is accompanied by the formation of the gas acetylene, according to the reaction:

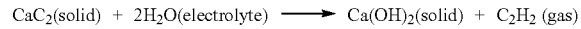

$$CaC_2(solid) + 2H_2O(electrolyte) \longrightarrow Ca(OH)_2(solid) + C_2H_2(gas)$$

The water is removed by the formation of calcium hydroxide and by degassing of the acetylene.

The acetylene is removed by evaporation, by degassing or by purging by means of inert gases, such as nitrogen or helium, which makes it possible to completely remove the acetylene formed in the electrolytic solution.

It has been found, unexpectedly, that the size of the $CaC_2$ particles influences the amount of residual water. This is because it has been demonstrated that, by the use of particles of micrometric size and preferably of nanometric size, the contact surface area between the water molecules and that developed by the $CaC_2$ particles is increased and thus the amount of residual water removed is at its maximum.

In order to provide efficient contact between the electrolyte ($H_2O$) and the particles of calcium salts, such as $CaC_2$, the mixture is advantageously placed in a mixer operating for a period of time which is advantageously one hour.

A centrifuge, preferably of ultracentrifuge type, is used in order to separate the liquid phase, composed of the purified electrolyte, from the solid phase, composed of the calcium hydroxide and of a small percentage of unreacted calcium carbide.

Separation of the liquid and solid phases can also be achieved by settling the solid phase.

The process of the disclosure can be carried out continuously, batchwise or semicontinuously.

The calcium carbide recovered by calcination of the calcium hydroxide formed during the purification can advantageously be recycled.

The purification is preferably carried out under an inert atmosphere, more preferably still under argon and/or under nitrogen.

In the case of a semicontinuous realization of the process of the disclosure, the purification is advantageously carried out by continuous percolation of the liquid electrolyte over a bed of calcium salt until the bed of calcium salt has been exhausted.

A first embodiment of the disclosure is composed of a process for the purification of an ionic electrolyte comprising at least one alkali metal salt. This process comprises at least one stage in which particles of at least one calcium salt, preferably chosen from the group consisting of $CaC_2$, $CaH_2$ and the mixtures of the latter, are brought into contact with the electrolyte.

According to a first alternative form, the process of the disclosure is applied to the purification of a liquid ionic electrolyte, preferably liquid at ambient temperature, which comprises at least one solvent which provides the ionic conductivity and which dissolves the alkali metal salt, this solvent being of ionic type.

According to a second alternative form, the electrolyte is of polymer gel type or of the type comprising a mixture of at least two polymer gels and the purification is carried out before the formation of a polymer matrix.

According to a third alternative form, the ionic electrolyte is of molten salt (ionic liquid) type, with or without alkali metal salt, preferably with or without lithium salt. More preferably still, the electrolyte comprises a molten salt or a mixture of at least two molten salts.

According to a fourth alternative form, the ionic electrolyte is a mixture of at least two electrolytes chosen from the group consisting of electrolytes of liquid, gel and molten salt type.

According to an advantageous embodiment, the purification is applied to a liquid electrolyte which comprises:
between 0.1 and 2 Molar of at least one alkali metal salt;
a solvent for the alkali metal salt which contributes to the ionic conductivity of the solution; and
up to 6000 ppm of impurities.

According to another advantageous embodiment of the process, the latter is applied to the purification of a gel electrolyte which comprises:
between 0.1 and 2 Molar of at least one alkali metal salt;
a solvent for the alkali metal salt which contributes to the ionic conductivity of the solution;
up to 6000 ppm of impurities; and
a polymer or a blend of polymers, preferably up to 30% by weight of a polymer which provides the formation of a gel matrix within the liquid electrolyte or preferably up to 30% by weight of a polymer blend which provides the formation of one or more gel matrices within the liquid electrolyte.

According to another advantageous embodiment of the process, the latter is applied to the purification of an electrolyte of molten salt type which comprises:
between 0 and 2 Molar of at least one alkali metal salt;

optionally a solvent for the alkali metal salt which contributes to the ionic conductivity of the solution; and
up to 6000 ppm of impurities.

Preferably, the anion of the molten salt is bis(fluorosulfonyl)imide ($FSI^-$) and/or bis(trifluoromethanesulfonyl)imide ($TFSI^-$).

More advantageously, the cation of the molten salt is ethyl-3-methylimidazolium (EMI) and/or (n-methyl)(n-propyl)pyrrolidium and/or (n-methyl)(n-butyl)pyrrolidium ($PY14^+$) and/or (n-propyl)piperidinium ($PPT3^+$).

According to another advantageous embodiment of the process of the disclosure, the process is applied to the purification of an electrolyte mixture chosen from the group of (ionic liquids plus polymer), (ionic liquid plus solvent) and (ionic liquid plus solvent plus polymer).

A purification process of the disclosure can be applied to the purification of electrolytes comprising any type of alkali metal salt but is particularly advantageous when it is applied to the purification of electrolytes comprising any type of an alkali metal salt chosen from the group consisting of KTFSI, $NaBF_4$, lithium salts and the mixtures of at least two of these salts.

The electrolytes which are successfully purified by a process of the disclosure preferably comprise between 50 and 5000 ppm of impurities (limits included) and more preferably still between 700 and 2000 ppm of water (limits included), the other impurities preferably being chosen from the group consisting of HF, Na, K and the mixtures of at least two of the latter.

According to another preferred embodiment of the process, the process is carried out using particles of the calcium salt which are used for carrying out the purification exhibiting a $d_{50}$ of between 1 and 100 micrometers, limits included, and more preferably still a $d_{50}$ of between 10 and 50 micrometers, limits included.

Preferably, the particles of calcium salt have a specific surface, measured according to the BET method, which is between 5 and 200 $m^2$/gram, limits included, more preferably still a specific surface of between 30 and 100 $m^2$/gram, limits included.

Particularly advantageous results are obtained when the amount of calcium salt used is in excess with respect to the amount of water to be removed, this amount preferably representing at least 5 grams per 20 ml of electrolyte to be purified, more preferably still from 10 to 15 grams per 20 ml of electrolyte to be purified.

According to another advantageous alternative form, the process for the purification of the electrolyte is carried out with the addition of the particles of calcium salt to the electrolyte to be purified and by homogenization of the mixture thus obtained, preferably by mechanical stirring and/or by ultrasound, preferably for a period of time of between 5 minutes and 3 hours, again preferably under an inert atmosphere, which is preferably composed of argon, of nitrogen or of helium or of a mixture of these gases, and also advantageously at a temperature of between 10 and 80° Celsius, more preferably still at a temperature of between 25 and 60° Celsius, more advantageously still at a temperature in the vicinity of 40° Celsius.

Excellent results are obtained for the purification process by using particles of calcium salt which have a size of between 100 micrometers and 1 nanometer, preferably a size of between 50 micrometers and 5 nanometers.

Preferably, the electrolyte is purified by bringing particles of $CaC_2$ and/or $CaH_2$ into contact with the electrolyte to be purified.

Advantageously, the alkali metal salt is a lithium salt preferably chosen from the group consisting of LiFSI, LiTFSI, LiBETI, $LiPF_6$, $LiClO_4$, $LiBF_4$, $LiCF_3SO_3$, LiBOB, LiDCTA and the mixtures of at least two of the latter, and the lithium salt is present in the electrolyte at a concentration preferably of between 0.1 and 2 Molar and more preferably between 0.2 and 1 Molar, expressed with respect to the amount of electrolyte. The lithium salt can also be present in the electrolyte at a concentration of between 0.5 and 1.5 Molar, expressed with respect to the amount of electrolyte.

When a solvent which dissolves the alkali metal salt is used, it is preferably a carbonate chosen from the group consisting of: EC (ethylene carbonate), PC (propylene carbonate), DME (dimethylethylene), DMC (dimethyl carbonate), DEC (diethyl carbonate), EMC (ethyl methyl carbonate), GBL (γ-butyrolactone) and the mixtures of at least two of the latter, the solvent being the molar reference with respect to which the amount of alkali metal salt to be added is calculated.

During the implementation of the process of the disclosure for the purification of an electrolyte of polymer gel type, the polymer is of polyether, siloxane, PVDF (polyvinyidifluoro), polyacrylonitrile, EPDM (ethylene/propylene/diethyl monomer), PMMA (poly(methyl methacrylate)) type or of the type consisting of a blend of at least two of these polymers; the polymer content of the electrolyte is preferably between 1 and 30%, more preferably still between 5 and 15%, of the total weight of the electrolyte.

Mention may be made, as a preferred embodiment, of the application to the purification of a liquid electrolyte comprising:
between 0.1 and 2 Molar of an alkali metal salt;
a solvent;
between 50 and 5000 ppm of impurities, preferably including 700 to 2000 ppm of water,
said process comprising the following stages:
a) of mixing the electrolyte with an amount of a calcium salt which corresponds to an excess of the amount of water to be removed, preferably of mechanical mixing carried out in a mixer and for a period of time of between 5 minutes and 3 hours, more preferably for a period of time of approximately 1 hour, and preferably with removal of the gases formed;
b) of separating the solid phase, composed in particular of the calcium hydroxide formed in stage a) and of the excess of calcium salt, from the liquid phase, composed of the purified electrolyte, by settling, by centrifuging or by ultracentrifuging or by a combination of at least two of these techniques; and
c) optional conversion of the calcium hydroxide to calcium carbide, preferably by calcination, and recycling the calcium carbide thus obtained in stage a),
the removal of the solid phase from the mixture obtained at the end of stage a) having to be completed rapidly, preferably in less than 10 minutes and more preferably still in less than 5 minutes, after the end of stage a) and it being possible for stages a) and b) to be carried out as often as necessary in order to achieve the desired degree of purification.

Mention may be made, as a preferred embodiment, of the application to the purification of an electrolyte of molten salt type comprising:
at least one molten salt;
between 0.1 and 2 Molar of an alkali metal salt, the amount of alkali metal salt being expressed with respect to the amount of molten salt; and
optionally solvents;

between 50 and 5000 ppm of impurities, preferably including 700 to 2000 ppm of water;

said process comprising the following stages:

a) of mixing the electrolyte with an amount of a calcium salt which corresponds to an excess of the amount of water to be removed, preferably of mechanical mixing carried out in a mixer and for a period of time of between 5 minutes and 3 hours, more preferably for a period of time of approximately 1 hour, and preferably with removal from the mixture of the gases formed;

b) of separating the solid phase, composed in particular of the calcium hydroxide formed in stage a) and of the excess of calcium salt, from the liquid phase, composed of the purified electrolyte, by settling, by centrifuging or by ultracentrifuging or by a mixture of at least two of these techniques; and c) optional conversion of the calcium hydroxide to calcium carbide, preferably by calcination, and recycling the calcium carbide thus obtained in stage a), the stage of removal of the solid phase from the mixture obtained at the end of stage a) having to be completed rapidly, preferably in less than 10 minutes and more preferably still in less than 5 minutes, after the end of stage a) and it being possible for stages a) and b) to be carried out as often as necessary in order to achieve the desired degree of purification.

Mention may be made, as another preferred embodiment, of the application to the purification of an electrolyte of gel type. For this type of electrolyte, the purification is carried out starting from an electrolyte precursor comprising:

between 0.1 and 2 Molar of an alkali metal salt;

a solvent;

between 50 and 5000 ppm of impurities, preferably including 700 to 2000 ppm of water; and a polymer present in the liquid electrolyte after 30% by weight;

said process comprising the following stages:

a) of mixing the electrolyte precursor with an amount of a calcium salt which corresponds to an excess of the amount of water to be removed, preferably of mechanical mixing carried out in a mixer and for a period of time of between 5 minutes and 3 hours, more preferably for a period of time of approximately 1 hour, and preferably with removal from the mixture of the gases formed;

b) of separating the solid phase, composed in particular of the calcium hydroxide formed in stage a) and of the excess of calcium salt, from the liquid phase, composed of the purified electrolyte precursor, by settling, by centrifuging or by ultracentrifuging or by a mixture of at least two of these techniques;

c) of converting the electrolyte precursor to a polymer gel electrolyte by converting the polymer to a polymer matrix, the conversion preferably being carried out at a temperature of between 60 and 80° C., limits included, for a period of time which is preferably between 15 minutes and 120 minutes, preferably between 45 and 60 minutes, and in the presence of a precursor of the matrix which is preferably chosen from those described in the 4-branched patent WO 03/063287 and which is at a content of between 500 and 2000 ppm, preferably of approximately 1000 ppm, more advantageously still the precursor is a Perkadox (trade mark) type, salt from Akzo-Nobel, and the conversion of the polymer to polymer matrix is preferably carried out in the electrochemical system in which the purified electrolyte precursor is placed; and d) optionally converting the calcium hydroxide to calcium carbide, preferably by calcination, and recycling the calcium carbide thus obtained in stage a), the removal of the solid phase from the mixture obtained at the end of stage a) having to be completed rapidly, preferably in less than 10 minutes and more preferably still in less than 5 minutes, after the end of stage a) and it being possible for stages a) and b) to be carried out as often as necessary in order to achieve the desired degree of purification.

A purification process of the disclosure, independently of the electrolyte to be purified, can be carried out continuously and, in this case, preferably, the calcium carbide recovered in stage c) is recycled in stage a); and the purification is preferably carried out under an inert atmosphere, more preferably still under argon and/or under nitrogen.

A purification process of the disclosure, independently of the electrolyte to be purified, can be carried out semicontinuously and, in this case, preferably, by continuous percolation of the liquid electrolyte over a bed of calcium salt until the bed of calcium salt has been exhausted.

A second embodiment of the disclosure is composed of a purified liquid electrolyte obtained by employing one of the processes according to the first embodiment of the disclosure.

Preferably, this electrolyte comprises less than 20 ppm of one or more impurities. More advantageously still, the electrolyte comprises less than 1 ppm of one or more impurities. This impurity is advantageously water.

Advantageously, the liquid electrolyte comprises:

at least one alkali metal salt;

a solvent;

impurities; and optionally a polymer, said electrolyte satisfying at least one of the following conditions:

less than 10 ppm of water, measured according to the Karl Fischer method;

less than 10 ppm of HF, measured by filtration;

less than 10 ppm of potassium, measured by ICP (inductively coupled plasma); and less than 10 ppm of sodium, measured by ICP.

Advantageously, the liquid electrolyte will comprise:

less than 5 ppm of water;

less than 5 ppm of HF;

less than 5 ppm of potassium; and less than 5 ppm of sodium.

More advantageously still, the liquid electrolyte will comprise:

less than 1 ppm of water;

less than 1 ppm of HF;

less than 1 ppm of potassium; and less than 1 ppm of sodium.

According to another particularly advantageous alternative form, the liquid electrolyte will comprise:

less than 0.5 ppm of water;

less than 0.5 ppm of HF;

less than 0.5 ppm of potassium; and less than 0.5 ppm of sodium.

A third embodiment of the disclosure is composed of an electrochemical generator comprising a purified electrolyte obtained by employing a constituent process of the first embodiment of the disclosure or comprising a constituent purified electrolytes of the second embodiment of the disclosure.

The generator is advantageously of Li-ion type or of Li-metal type.

According to a particularly advantageous alternative form, the anode in the generators of the disclosure is of graphite, carbon, carbon fiber, alloy or $Li_4Ti_5O_{12}$ or of a mixture of at least two of the latter.

According to another particularly advantageous alternative form, the cathode in the generators of the disclosure is chosen from the group consisting of the cathodes of $LiCoO_2$, $LiMnN_2O_4$, $LiFeMnPO_4$, $LiFePO_4$, $LiCo_{1/3}Mn_{1/3}Ni_{1/3}$, $LiCoPO_4$ and $Li_4Ti_5O_{12}$ type and of a mixture of at least two of the latter.

Generators of the disclosure, of Li rechargeable type or primary type, the anode of which is based on lithium metal, and which comprise an electrolyte of the disclosure, are of particular advantage.

A fourth embodiment of the disclosure is composed of a process for the purification of an impure alkali metal salt, said process consisting in dissolving the alkali metal salt in a solvent with a low evaporation temperature, preferably chosen from the group consisting of acetone, toluene, heptane, ethanol and the mixtures of at least two of the latter, and with a very low water content, and then treating the solution alkali metal salt thus obtained with an excess of calcium salt and, finally, in separating the liquid phase, comprising the alkali metal salt and the solvent, from the solid phase, comprising the impurities and calcium hydroxide.

Preferably, the impure alkali metal salt is chosen from lithium, sodium, potassium and the impure mixtures of at least two of the latter. Preferably, impure lithium salts will be chosen.

Preferably, this purification process is applied to an alkali-metal salt, preferably to a lithium salt which is selected from the group consisting of LiFSI, LiTFSI, LiBETI, $LiPF_6$, $LiClO_4$, $LiBF_4$, $LiCF_3SO_3$, LiBOB, LiDCATA and the mixtures of at least two of the latter.

Preferably, the alkaline metal salts, preferably the lithium salts, to be purified exhibit contents of impurities, preferably of water or of HF or a mixture of the latter, of between 100 and 500 ppm.

Advantageously, the alkali metal salts to be purified are chosen from the group of impure sodium, potassium and lithium salts and the mixtures of at least two of the latter.

Advantageously, the lithium salts to be purified are chosen from the group consisting of LiFSI, LiTFSI, LiBETI, $LiPF_6$ and the mixtures of at least two of the latter.

Particularly advantageous performances are obtained when the purification is carried out with a ratio, lithium salt to be purified/solvent with a low evaporation temperature, which is between 0.1M and 2M, preferably between 0.2M and 1M.

A fifth embodiment of the disclosure is composed of the alkali metal salts, preferably of the purified lithium salts, obtained by employing one of the constituent processes of the fourth embodiment of the disclosure.

Preferably, these purified alkali metal salts are characterized by at least one of the following characteristics:
  a water content of less than or equal to 20 ppm; and
  an improved stability to cycling of a battery comprising the alkali metal salt, with a reduced or zero loss in capacity, without formation of interfering reactants, such as HF, which destroy the components of the battery.

In a cycling (charge/discharge) test carried out between 4 and 2.5 volts, a reduction of at least 1% in the loss in capacity per 100 cycles may be found.

The following examples are given purely by way of illustration and should not constitute any limitation on the embodiments of the disclosure as defined in the claims.

The lithium salts used in examples 1 to 3 and their method of preparation are described in particular in the two Hydro-Quebec U.S. Pat. No. 6,576,159 and U.S. Pat. No. 6,333,425.

The lithium salts used in examples 4 and 5 are commercial products.

Example 1

10 grams of calcium carbide ($CaC_2$) particles, having a particle size $d_{50}$=20 μm and a specific surface, measured according to the BET (Brunauer-Emmett-Teller) method which is 30 $m^2$/gram, are introduced into a polyethylene bottle with a volume of 50 ml and mixed with 40 ml of an electrolyte with a composition: LiFSI+EC-γBL.

The impurities identified in the electrolyte are HF and $H_2O$ at contents respectively of 200 and 1100 ppm.

The preparation is carried out in a glove box under a helium atmosphere. Subsequently, the bottle is placed for 1 hour in a mixer situated outside the glove box. The bottle of the mixture is then placed for 5 minutes in an ultracentrifuge operated at a rotational speed of 13 000 rpm (revolutions per minute), this being done in order to separate the liquid phase from the solid phase.

The purified electrolyte is separated by settling in the glove box. The treatment is repeated three times in order to remove as much as possible of traces of solids and of impurities. The amount of residual water in the final purified electrolyte, measured by the Karl Fischer method, is less than 1 ppm.

Example 2

19.8 grams of LiFSI are mixed in 100 ml of EC+γBL (ethylene carbonate and gamma-butyrolactone).

The impurities identified in the electrolyte are HF and $H_2O$.

The $H_2O$ content is 1000 ppm and the HF content is 150 ppm. The color of the solution is yellowish.

Two identical button batteries are assembled with 0.2 ml of the unpurified 1 M LiFSI+EC+γBL solution according to the following arrangement:
  natural graphite (NG)(−)/(electrolyte: 1 M LiTFSI+EC γBC)/LiFePO_4(+), exhibiting an impedance of 750 ohms.

Two identical batteries were thus prepared in order to confirm the reproducibility of their performances.

The electrochemistry shows that the capacity obtained after C/24 cycling (charge over 24 hours and discharge over 24 hours) is 5.25 mAh/g of $LiFePO_4$, which is equivalent to 3% of the theoretical capacity.

The 1M LiFSI solution in EC+γBL used above is purified according to the method of the disclosure, carried out under the same conditions as in the preceding example 1. It is found that its water content is reduced to 1 ppm and that the color of the solution is light.

The two button batteries of NG/1M LiFSI EC+γBL (purified)/$LiFePO_4$ type assembled with 0.5 ml of the purified solution exhibit an impedance of 9 ohms.

The capacity obtained is 140 mAh/g, which represents 80% of the theoretical capacity.

Example 3

14.9 grams of an LiDCTA salt are mixed with 100 ml of EC+γBL. The color of the solution is dark brown.

The impurities identified in the electrolyte are HF and $H_2O$.

The $H_2O$ content is 1400 ppm.

Two button batteries of $Li_4Ti_5O_{12}$ (−)/1M LiDCTA+EC+γBL/LiFePO$_4$ (+) type are assembled. Their impedance is 950 ohms.

The capacity of the two button batteries is 3.5 mAh/g of LiFePO$_4$, which corresponds to 2% of the theoretical capacity.

The 1M LiDCTA+EC+γBL solution is purified according to the method of the disclosure, carried out under the conditions of example 1, until a water content of 2 ppm is obtained. The solution obtained is light.

Two button batteries of $Li_4Ti_5O_{12}$ (−)/1M IFSI+EC+γBL/LiFePO$_4$ (+) type are assembled with the purified solution. Their impedance is 7 ohms.

Their capacity is 157 mAh/g of LiFePO$_4$, which gives 90% of the theoretical capacity.

Example 4 (Dosing 1000 ppm of Water)

The industrial solution of 1M LiPF$_6$+EC+DEC (diethyl carbonate), sold in 2003 by Tomiyama (Japan), is selected for the realization of the example.

The commercial electrolytic solution comprises, as impurities, a water content of 20 ppm, an HF content of 14 ppm and a content of each of the entities Ca, Fe and K of 1 ppm.

Two identical button battery cells are assembled as follows:

NG (−)/1M LiPF$_6$+EC+DEC/LiFePO$_4$ (+).

Their impedance is 10 ohms and their capacity is 75% of the theoretical capacity.

An amount of 1000 ppm of water was injected into the 1M LiPF$_6$+EC+DEC mother solution. After 24 hours, the HF content rose to 75 ppm. On the other hand, the Ca content, Fe content and K content remained constant at 1 ppm. The solution turned yellowish. The addition of water to the commercial electrolytic solution makes it possible to model the aging of the electrolyte in a humid environment.

The impedance of the two button batteries is increased to 770 ohms. The capacity obtained is 4% of the theoretical capacity.

The 1M LiPF$_6$+EC+DEC solution comprising 1000 ppm of water is purified according to the method of the disclosure, carried out under the conditions of example 1, until a water content of 1 ppm and an HF content of 3 ppm are obtained.

No trace of Na, Ca or K is detected.

Two identical button batteries are assembled according to the following chemistry:

NG (−)/1M LiPF$_6$+EC+DEC/LiFePO$_4$ (+).

The impedance of these two batteries is 7 ohms and the capacity is 80% of the theoretical capacity.

Example 5—Storage of the Electrolyte

The 1M LiPF$_6$+EC+DEC solution sold by Tomiyama in 2003 is used for the representation of the example. This solution initially comprises 20 ppm of water and 14 ppm of HF. It is stored outside the glove box for 11 months.

It is then found that, during this period, the water content changed to 500 ppm and the HF content changed to 350 ppm.

Two button batteries are assembled as follows:

NG/1M LiPF$_6$+EC+DEC/LiFePO$_4$.

The impedance of the two cells is 450 ohms. The capacity obtained is 8.7 mAh/g of LiFePO$_4$, which gives 5% of the theoretical capacity.

The solution is purified according to the method of the disclosure, carried out under the conditions of example 1. Water content is 1 ppm and the HF content is 3 ppm.

The impedance of the two button batteries assembled with the purified solution is 7 ohms.

The capacity of these batteries is 140 mAh/g of LiFePO$_4$, which corresponds to 80% of the theoretical capacity.

Example 6—TFSI Ionic Liquid 10 grams of calcium carbide ($CaC_2$) particles, having a particle size $d_{50}$=20 μm and a measured specific surface which is 30 m$^2$/gram, are introduced into a polyethylene bottle with a volume of 50 ml and mixed with 30 ml of an ionic liquid with the composition: ethylmethylimidazolium (EMI$^+$) bis(trifluoromethane-sulfonyl)imide (TFSI).

The content of water measured in the non purified electrolyte is 1200 ppm.

The preparation is carried out in a glove box under a helium atmosphere.

The bottle is subsequently placed for 1 hour in a mixer situated outside the glove box.

The bottle of the mixture is then placed for 5 minutes in a ultracentrifuge operated at a rotational speed of 13 000 rpm, this being done in order to separate the liquid and solid phases.

The purified electrolyte is separated by settling in the glove box. The treatment is repeated three times in order to remove as much as possible of traces of solids and of impurities. The amount of residual water in the final purified electrolyte, measured by the Karl Fischer method, is less than 5 ppm of water.

Example 7—TFSI Ionic Liquid 10 grams of calcium carbide ($CaC_2$) particles, having a particle size $d_{50}$=20 μm and a measured specific surface which is 30 m$^2$/gram, are introduced into a polyethylene bottle of a volume of 50 ml and mixed with 35 ml of an ionic liquid with the composition: ethylmethylimidazolium (EMI$^+$) bis(trifluoromethane-sulfonyl)imide (TFSI) of example 6 with 1 M LiTFSI.

The content of water measured in the non purified electrolyte is 1100 ppm.

The preparation is carried out in a glove box under a helium atmosphere. The bottle is subsequently placed for 1 hour in a mixer situated outside the glove box. The bottle of the mixture is then placed for 5 minutes in an ultracentrifuge operated at a rotational speed of 13 000 rpm, this being done in order to separate the liquid and solid phases.

The purified electrolyte is separated by settling in the glove box. The treatment is repeated three times in order to remove as much as possible of traces of solids and of impurities. The amount of residual water in the final purified electrolyte, measured by the Karl Fischer method, is less than 7 ppm of water.

Example 8—TFSI Ionic Liquid+1M LITFSI Mixture 10 grams of calcium carbide ($CaC_2$) particles, having a particle size $d_{50}$=20 μm and a measured specific surface which is 30 m$^2$/gram, are introduced into a polyethylene bottle of a volume of 50 ml and mixed with 30 ml of an ionic liquid with the composition: ethylmethylimidazolium (EMI$^+$) bis(trifluoromethane-sulfonyl)imide (TFSI) of example 6 with 1M LiTFSI.

The content of water measured in the non purified electrolyte is 1500 ppm.

The preparation is carried out in a glove box under a helium atmosphere. The bottle is subsequently placed for 1 hour in a mixer situated outside the glove box. The bottle of the mixture is then placed for 5 minutes in an ultracentrifuge operated at a rotational speed of 13 000 rpm, this being done in order to separate the liquid and solid phases.

The purified electrolyte is separated by settling in the glove box. The treatment is repeated three times in order to remove as much as possible of traces of solids and of impurities. The amount of residual water in the final purified electrolyte, measured by the Karl Fischer method, is less than 10 ppm of water.

Example 9—FSI Ionic Liquid+1M LIFSI 10 grams of calcium carbide (CaC$_2$) particles, having a particle size $d_{50}$=20 μm and a measured specific surface which is 30 m$^2$/gram, are introduced into a polyethylene bottle with a volume of 50 ml and mixed with 40 ml of an ionic liquid with a composition: ethylmethylimidazolium (EMI$^+$) bis(fluorosulfonyl)imide (FSI)+1M LiFSI.

The content of water measured in the non purified electrolyte is 1300 ppm.

The preparation is carried out in a glove box under a helium atmosphere. The bottle is subsequently placed for 1 hour in a mixer situated outside the glove box. The bottle of the mixture is then placed for 5 minutes in an ultracentrifuge operated at a rotational speed of 13 000 rpm, this being done in order to separate the liquid and solid phases.

The purified electrolyte is separated by settling in the glove box. The treatment is repeated three times in order to remove as much as possible of traces of solids and of impurities. The amount of residual water in the final purified electrolyte, measured by the Karl Fischer method, is less than 10 ppm of water.

Example 10—Purification of an LITFSI Salt in a Solvent (Acetonitrile)

10 grams of calcium carbide (CaC$_2$) particles, having a particle size $d_{50}$=20 μm and a measured specific surface which is 30 m$^2$/gram, are introduced into a polyethylene bottle with a volume of 50 ml and mixed with 30 ml of an ionic liquid with the composition: 1M of LiTFSI in acetonitrile. The LiTFSI comprises 2000 ppm of H$_2$O and the acetonitrile is anhydrous (Aldrich).

The content of H$_2$O measured in the non purified electrolyte is 2000 ppm.

The preparation is carried out in a glove box under a helium atmosphere. The bottle is subsequently placed for 1 hour in a mixer situated outside the glove box. The bottle of the mixture is then placed for 5 minutes in an ultracentrifuge operated at a rotational speed of 13 000 rpm, this being done in order to separate the liquid and solid phases.

The purified electrolyte is separated by settling in the glove box. The treatment is repeated three times in order to remove as much as possible of traces of solids and of impurities. The amount of residual water in the final purified electrolyte, measured by the Karl Fischer method, is less than 10 ppm of water.

One of the particularly advantageous applications of embodiments of the disclosure lies in the possibility of purifying electrolytes stored for more than six months. This purification technique is particularly economic for companies which produce batteries and for those which produce electrolytes. This is because, in the case of companies which produce batteries, any production problem which would last several weeks might result in the loss of the entire stock of electrolyte.

Thus, with an embodiment of the method according to the disclosure, the storage time for the electrolytes becomes potentially limitless.

In another application of the disclosure, the companies which produce electrolytes can use the purification method as final stage after the synthesis of the electrolyte. In fact, the residual water will be removed and thus the duration of storage of the electrolyte is extended.

In another application of the disclosure, producers of lithium salts can improve the quality of the lithium salts, which are often obtained in an impure and possibly hydrogenated solid form. Lithium salts are known for their hygroscopic properties. The lithium salt is first dissolved in a solvent with a low evaporating temperature, such as acetone, toluene, heptane, ethanol or a mixture of at least two of the latter, and with a very low water content. Treatment of the lithium salt solution with an excess of calcium salt (excess with respect to the amount of water present in the solution) makes it possible to reduce the water content to the scale of a few ppm after separation of the liquid and solid phases.

Finally, an embodiment of the method of the disclosure makes available novel electrolytes characterized by an exceptional degree of purity and thus opens the door to the preparation of electrochemical systems using an electrolyte based on a lithium salt and with a level of performance never achieved to date.

Although the present disclosure has been described using specific implementations, it is understood that several variations and modifications may be grafted to said implementations and the present disclosure is targeted at covering such modifications, usages or adaptations of the present disclosure generally following the principles of the disclosure and including any variations of the present description which will become known or conventional in the field of activity in which the present disclosure is encountered and which can be applied to the essential elements mentioned above, in agreement with the scope of the following claims.

What is claimed is:

1. A method for the purification of a liquid ionic electrolyte, said method comprising at least one step in which particles of at least one calcium salt are brought into contact with the electrolyte, wherein:
the electrolyte comprises at least one alkali metal salt dissolved in a liquid solvent, the alkali metal salt is LiFSI, LiTFSI, LiBETl, LiPF$_6$, LiClO$_4$, LIBF$_4$, LiCF$_3$SO$_3$, LIBOB, LiDCTA or a mixture thereof, and said calcium salt is CaC$_2$.

2. The method of claim 1, wherein the particles of the CaC$_2$ have a $d_{50}$ of between 1 and 100 micrometers, limits included.

3. The method of claim 1, wherein the particles of the CaC$_2$ have sizes between 100 micrometers and 1 nanometer.

4. The method of claim 1, wherein the particles of CaC$_2$ have a specific surface, measured according to the BET method, which is between 5 and 200 m$^2$/g, limits included.

5. The method of claim 1, wherein the amount of CaC$_2$ used is in excess with respect to the amount of water to be removed, the amount of calcium salt used representing at least 5 g per 20 ml of electrolyte to be purified.

6. The method of claim 1, wherein particles of the $CaC_2$ are brought into contact with the electrolyte by adding particles of calcium salt to the electrolyte and by homogenizating the mixture thus obtained.

7. The method of claim 1, wherein particles of the $CaC_2$ are brought into contact with the electrolyte by continuous percolation of the liquid electrolyte over a bed of calcium salt until the bed of calcium salt has been exhausted.

8. The method of claim 1, wherein the liquid solvent is selected from ethylene carbonate (EC), propylene carbonate (PC), dimethylethylene (DME), dimethyl carbonate (DMC), diethyl carbonate (DEC), ethyl methyl carbonate (EMC), γ-butyrolactone (GBL) and mixtures thereof.

9. The method of claim 1, wherein the liquid solvent is a solvent having a low boiling point, selected from acetone, toluene, heptane and ethanol.

\* \* \* \* \*